United States Patent
Matsushita et al.

(10) Patent No.: US 7,559,316 B2
(45) Date of Patent: Jul. 14, 2009

(54) INDICATOR FOR A VEHICLE HAVING A DUAL FUEL ENGINE

(75) Inventors: Masanori Matsushita, Aki-gun (JP); Tomoaki Saito, Aki-gun (JP); Hiroaki Mitsugi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/762,464

(22) Filed: Jun. 13, 2007

(65) Prior Publication Data

US 2008/0000457 A1 Jan. 3, 2008

(30) Foreign Application Priority Data

Jul. 3, 2006 (JP) .............................. 2006-183686

(51) Int. Cl.
 *F02D 19/06* (2006.01)
 *F02D 41/00* (2006.01)

(52) U.S. Cl. ...................................... 123/525; 701/104

(58) Field of Classification Search ................. 123/1 A, 123/27 GE, 536, 466, 479, 492–494, 431, 123/299, 300, 526; 340/467, 464, 466, 471, 340/479, 426.22, 426.23; 73/23.32, 866.3
See application file for complete search history.

(56) References Cited

U.S. PATENT DOCUMENTS

| | | | |
|---|---|---|---|
| 5,224,457 A * | 7/1993 | Arsenault et al. | 123/526 |
| 6,591,817 B2 | 7/2003 | Deutsch | |
| 6,864,786 B2 * | 3/2005 | Speckhart et al. | 340/467 |
| 7,019,626 B1 * | 3/2006 | Funk | 340/438 |
| 2006/0101823 A1 | 5/2006 | Takemoto et al. | |

FOREIGN PATENT DOCUMENTS

JP 2003-293807 10/2003

* cited by examiner

*Primary Examiner*—Michael Cuff
*Assistant Examiner*—Hung Q Nguyen
(74) *Attorney, Agent, or Firm*—Alleman Hall McCoy Russell & Tuttle LLP

(57) ABSTRACT

A fuel change indicator system for a vehicle. The system may comprise an internal combustion engine capable of combusting at least two different compositions of fuel and outputting torque to propel a vehicle; a fuel supply system configured to supply the fuel to said internal combustion engine and capable of changing the composition of the supplied fuel; an indicator capable of outputting a signal which is recognizable from outside of said vehicle; and a controller configured to control said fuel supply system to change the fuel composition; and control said indicator to output the signal in accordance with the fuel composition change.

11 Claims, 14 Drawing Sheets

INDICATOR FOR A VEHICLE HAVING A DUAL FUEL ENGINE

CROSS REFERENCE TO RELATED APPLICATIONS

This application claims foreign priority to Japanese Patent Application No. 2006-183686, filed Jul. 3, 2006.

BACKGROUND

The present description relates to a dual-fuel engine, more specifically to an indicator for a vehicle having a dual fuel engine as its propelling power source.

When an internal combustion engine combusts fuel with air charged therein, it generates heat energy. The engine may be mounted on a vehicle, and may convert the heat energy to torque output to a drive-train to propel the vehicle. For example, in U.S. Patent Application Publication US2006/010823A1, a dual-fuel engine for an automotive vehicle is disclosed to selectively combust two different kinds of fuels, in this case, gaseous hydrogen and gasoline. Between the two different fuels, the amounts of heat energy generated from combustion of the same volume of stoichiometric mixtures are different. In a dual-fuel engine, the maximum mixture volume is constant, but maximum torque from the different kinds of fuel is different. For example, when the fuel is switched from gasoline to hydrogen, the engine output torque will decrease if, before the fuel switching, the engine outputs more torque from gasoline than the maximum torque from hydrogen.

Therefore, the vehicle propelling force may decrease when the fuel is switched. Then, the acceleration of the vehicle may be reduced, and the vehicle may even decelerate if the vehicle running resistance is greater for example in a high speed driving condition. As a result, when a rear vehicle follows a front vehicle with a dual-fuel engine, and the fuel supplied to the front vehicle is switched, both of the vehicle drivers may need to know about the possibility of reduced acceleration or deceleration of the front vehicle.

In the '823 publication, when the hydrogen is supplied to the engine, it is indicated to the vehicle driver. Thus, the driver is informed that the fuel is switched from gasoline to hydrogen. However, the driver cannot tell if there is the possibility of the reduced acceleration of the vehicle. Further, other drivers who may be following the driver, for example, have no way of recognizing the possibility of the reduced acceleration of the vehicle due to the fuel switch.

SUMMARY

Accordingly, there is provided, in a first aspect of the present description, a fuel change indicator system for a vehicle, the system comprising an internal combustion engine capable of combusting at least two different compositions of fuel and outputting torque to propel a vehicle, and a fuel supply system configured to supply the fuel to the internal combustion engine and capable of changing the composition of the supplied fuel. The system further comprises an indicator capable of outputting a signal which is recognizable from outside of the vehicle, and a controller. The controller is configured to control the fuel supply system to change the fuel composition. It is further configured to control the indicator to output the signal in accordance with the fuel composition change.

In accordance with the first aspect, the indicator outputs the signal recognizable from the outside of the vehicle in accordance with the fuel composition change, for example from a liquid fuel to a gaseous fuel such as hydrogen. Therefore, from the outside of the vehicle, such as another vehicle driver, the possibility of reduced acceleration of the vehicle caused by the fuel composition change can be recognized. Consequently, safety of traffic in which the dual-fuel engine vehicle is involved can be improved.

In a second aspect of the present description, there is provided a method of controlling a vehicle system having an internal combustion engine to propel a vehicle. The internal combustion engine is capable of combusting at least two different compositions of fuel. The method comprises changing the composition of fuel supplied to said internal combustion engine, indicating a signal in accordance with the fuel composition change, and prohibiting the indicating the signal in accordance with an operating condition of the internal combustion engine.

In accordance with the second aspect, the signal indication in accordance with the fuel composition change is prohibited in accordance with an operating condition of the internal combustion engine. In other words, the signal indication is made only in certain engine operating conditions. Therefore, the signal indication can be limited to occasions where the vehicle behavior change caused by the fuel composition change needs to be known, for example. The limited occurrence of the signal indication can improve the effectiveness of the signal indication, for example, to the vehicle driver or the following driver. Consequently, safety of vehicle traffic in which the dual-fuel engine vehicle is involved can be improved.

In a third aspect of the present description, there is provided a method of controlling the vehicle system described above. The method comprises changing the composition of fuel supplied to the internal combustion engine, beginning to indicate a signal in accordance with the fuel composition change, and stopping the signal indication in accordance with an operating condition of the vehicle.

In accordance with the third aspect, the signal indication started in accordance with the fuel composition change is stopped in accordance with the vehicle operating condition. When the fuel composition is changed, the engine output torque may be substantially reduced, and it needs to be known. But as the time goes by, the once reduced torque will be constant, and the signal will not be indicated any more. Otherwise, the redundant indication may deteriorate the effectiveness of the indication. Therefore, the limited period of the signal indication can improve the effectiveness of the signal indication, for example, to the driver or the following vehicle driver.

In some embodiments, the indicator may be a visual display arranged on the vehicle, visible from behind the vehicle, for example, and further integrated with a brake light of an automotive vehicle so that a following driver can recognize a possibility of reduced acceleration of the preceding vehicle.

The signal indication may be prohibited when the desired output torque of the internal combustion engine is below a predetermined torque, for example when the desired output torque of the internal combustion engine after the fuel switching is within a predetermined amount from the desired output torque before the fuel switching. Accordingly, the signal indication can be limited to situations with higher possibility of reduced vehicle acceleration, and the effectiveness of the signal indication can be improved.

The signal indication, once started, may be stopped in accordance with output torque of the internal combustion engine. The engine output torque may temporarily drop during the fuel composition change due to engine operating constraints such as requirement for reduced noise and vibration. Then, the engine torque increases again after the completion of the fuel composition change, and then the signal indication may not be necessary any more. Instead of the engine torque, acceleration of the vehicle may be accounted for.

BRIEF DESCRIPTION OF THE DRAWINGS

FIG. 4A shows a characteristic of gasoline, and FIG. 4B shows a characteristic of a gaseous fuel.

DETAILED DESCRIPTION

Hereafter, an embodiment of the present disclosure will be explained referring to the accompanied drawings.

Figure 1:
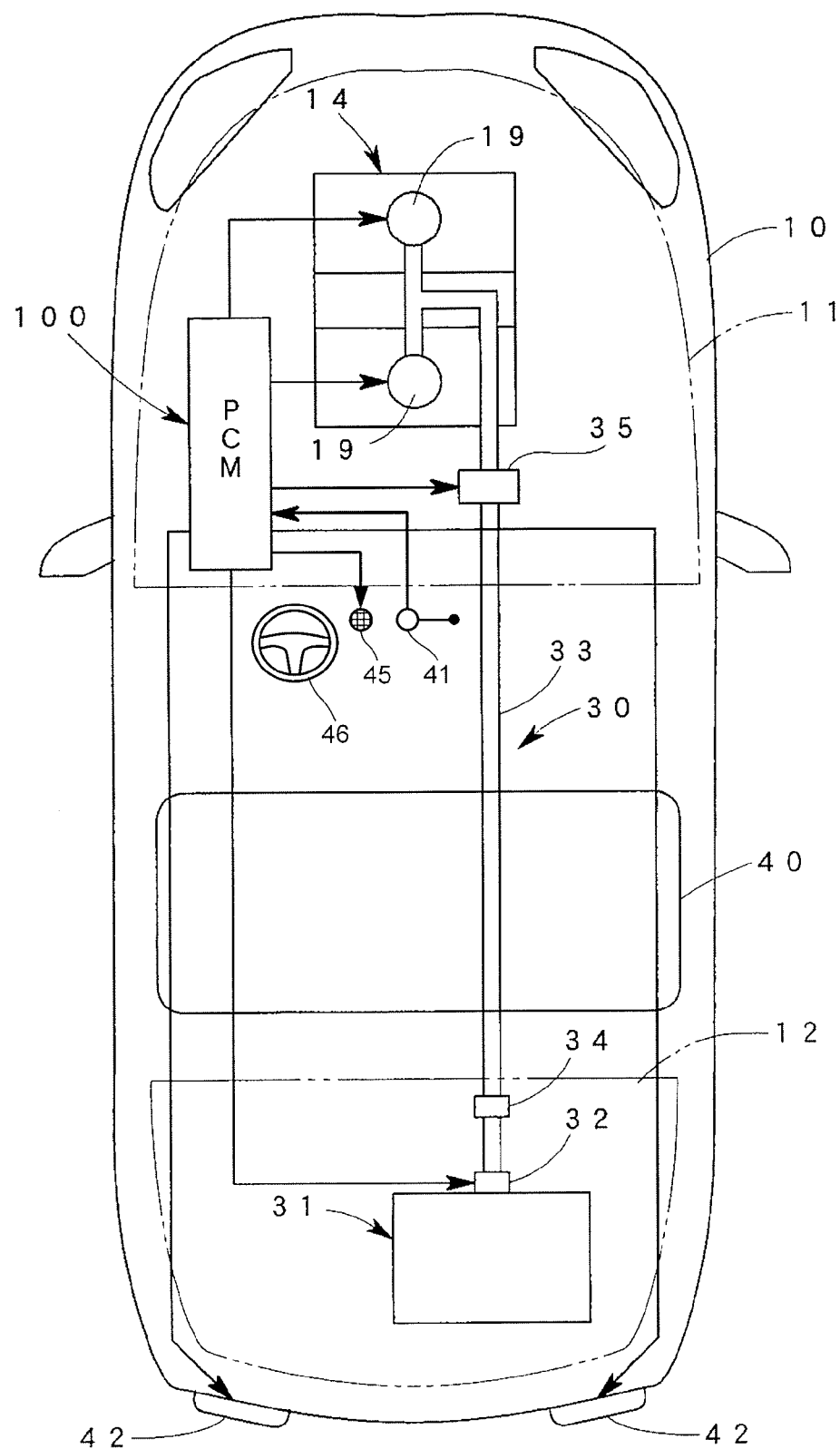
FIG. 1 is a schematic plan view showing a configuration of an engine according to one embodiment of the present invention.
Figure 2:
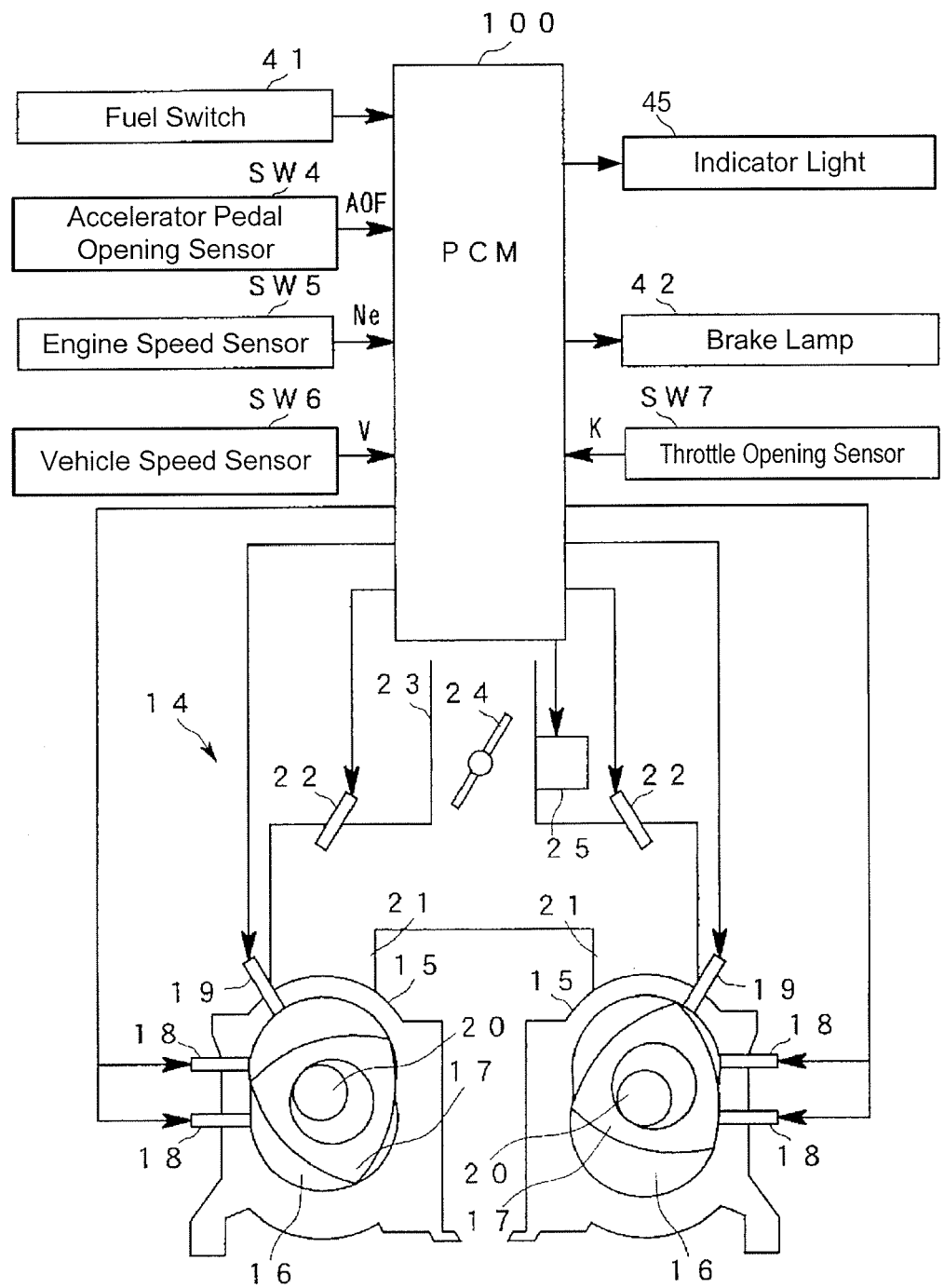
FIG. 2 is a block diagram schematically showing the engine.

FIG. 1 is a schematic plan view showing a configuration of an engine according to one embodiment. FIG. 2 is a block diagram schematically showing the engine.

Referring to FIG. 1, a vehicle 10 is provided with an engine compartment 11 and a trunk compartment 12. An engine 14 is disposed in the engine compartment 11 so as to be supported by frames of the vehicle.

Referring to FIG. 2, the engine 14 is a rotary engine. This engine 14 is of two-rotor type in which two rotor housings 15 (schematically shown in a divided state in FIG. 2) are integrally provided with three side housings (not shown) so that each of the rotor housings 15 is intervened between the side housings to form two rotor accommodating chambers 16.

The rotor accommodating chamber 16 is provided in a cocoon shape having a trochoid inner circumferential surface, and a rotor 17 is accommodated inside the rotor accommodating chamber 16.

The rotor 17 may be made of a special kind of a cast iron, and eccentrically revolves while apex seals provided to each apex constantly and slidingly contact with the inner circumferential surface of the rotor accommodating chamber 16. Thus, the rotor 17 defines three combustion chambers in the rotor accommodating chambers 16. Each of the rotor accommodating chambers 16 is connected with a pair of spark plugs 18 and a gaseous fuel injector 19. It is of a direct-injection type in which a gaseous fuel (hydrogen in this embodiment) supplied from a gaseous fuel system 30 (which is a main point of this embodiment) is directly injected into one of the combustion chambers.

Internal gear teeth are formed in a central hole of the rotor 17 so that a revolving orbit of the rotor 17 is precisely maintained by the internal gear teeth being mated with stationary gears provided on the side housing. Further, an eccentric shaft 20 fits in the central hole of the rotor 17.

Each of the rotor accommodating chambers 16 is also connected with an air-intake pipe 21 and an exhaust pipe (not illustrated). Fresh air is introduced in the combustion chamber through the air-intake pipe 21, and exhaust gas is discharged through the exhaust pipe.

A port fuel injector 22 for injecting gasoline fuel is mounted to each of the air-intake pipes 21. Each of the air-intake pipes 21 is branched for the rotor accommodating chambers 16 at a downstream end of an upstream air-intake pipe 23. A throttle valve 24 is provided in the upstream air-intake pipe 23 so that it is opened and closed by an actuator 25.

The spark plugs 18, the fuel injectors 19 and 22, and the actuator 25 are configured to be controlled by a control unit (PCM) 100 which will be described later.

Referring to FIG. 1, a gaseous fuel system 30 for supplying gaseous fuel to gaseous fuel injectors 19 will be explained.

As shown in FIG. 1, the gaseous fuel system 30 is provided with a gaseous fuel tank 31 arranged in the trunk compartment 12. The gaseous fuel tank 31 may have 60 liters of volume, for example, and may be filled with hydrogen as gaseous fuel at approximately 35 MPa.

A main valve 32 that can be opened and closed by a solenoid is mounted to the gaseous fuel tank 31. The main valve 32 extends in the front-and-rear direction of the vehicle 10, and is connected with a feed pipe 33 connected with the gaseous fuel injectors 19. A regulator valve 34 that decompresses gaseous fuel discharged from the main valve 32 to 0.6 MPa is provided in the feed pipe 33 on the upstream side (inside of the trunk compartment 12).

A cutoff valve 35 disposed in the engine compartment 11 is connected with the feed pipe 33. The cutoff valve 35 opens and closes the feed pipe 33 by a solenoid so that it prevents leaking of gaseous fuel while the engine 14 is not running.

A gasoline tank 40 for storing gasoline is provided in the vehicle 10. It is configured so that the gasoline in the gasoline tank 40 is injected from the port fuel injectors 22 to the engine 14 through a gasoline supply system.

In this embodiment, switching between gasoline and gaseous fuel is performed by a manual operation of a fuel switch 41 provided in an instrument panel of the automotive vehicle 10 as shown in FIG. 1. The driver who sits behind a steering wheel 46 of the automotive vehicle 10 can operate the fuel switch 41.

Further, well-known brake lamps 42 are provided in the vehicle 10. A message indicator light 45 is arranged on the instrument panel. The driver sitting behind the steering wheel 46 can see the message indicator light 45.

Referring to FIGS. 1 and 2, the control unit 100 is a unit whose main components are a microprocessor, a main storage device, an auxiliary storage device, and an input/output device. An input component to be connected with the control unit 100 includes the fuel switch 41, an accelerator pedal opening sensor SW4, an engine speed sensor SW5, a vehicle speed sensor SW6, and a throttle opening sensor SW7. Further, an output component to be connected with the control unit 100 includes the spark plugs 18, fuel injectors 19 and 22, actuator 25, main valve 32 of gaseous fuel tank 31, cutoff valve 35, brake lamps 42, and indicator light 45, as mentioned above.

Figure 3:
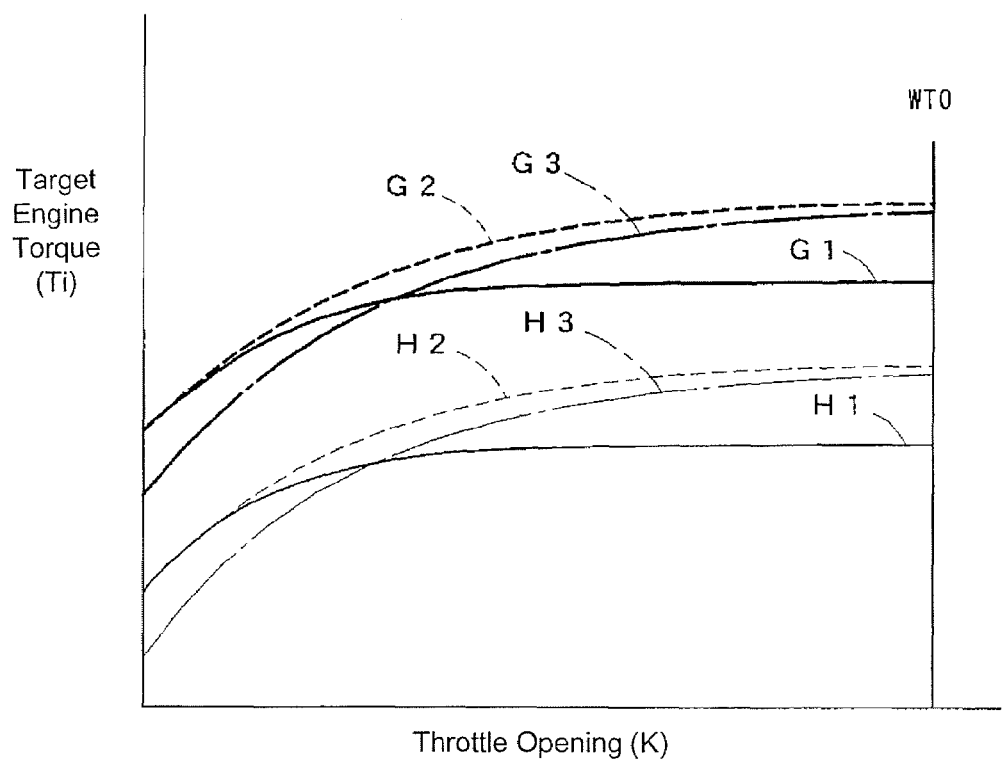
FIG. 3 is a graph showing a characteristic relationship between a target torque and a throttle opening.

FIG. 3 is a graph showing a relationship between a target torque T and a throttle opening K.

Referring to FIG. 3, the auxiliary storage device of the control unit 100 stores a gasoline map Mg and a gaseous fuel map Mh (refer to FIGS. 6 and 12) for switching a fuel type. The maps Mg and Mh are created based on experimental values of the relationship between the target engine torque Ti and the throttle opening K.

The gasoline map Mg is set based on gasoline characteristics G1-G3 in FIG. 3, and gaseous fuel map Mh is set based on gaseous fuel characteristics H1-H3 in FIG. 3. In the illustrated example, G1 and H1 are at 1,000 RPM of the engine speed V, G2 and H2 are at 2,500 RPM, and G3 and H3 are at 4,000 RPM, respectively.

Figure 4B:
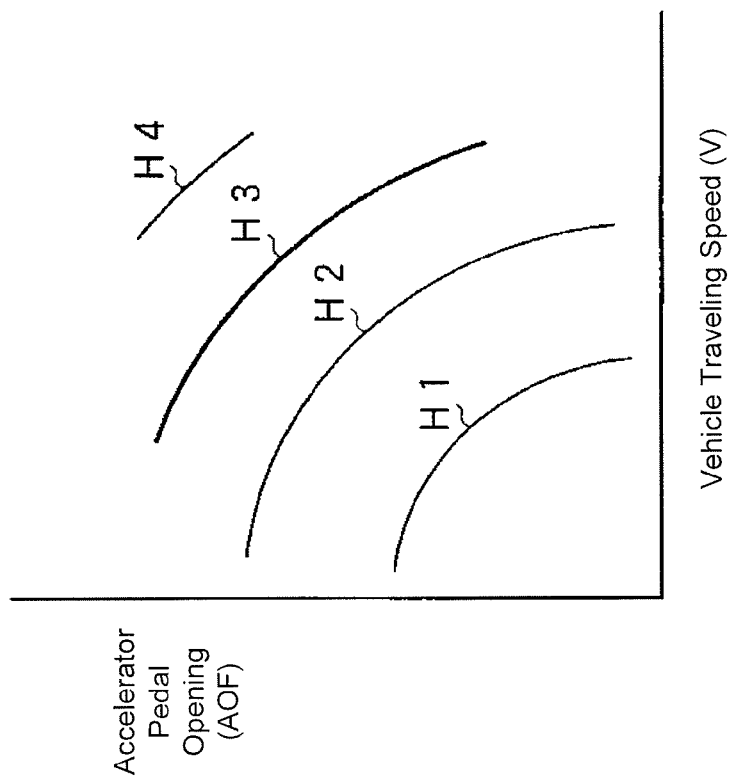
FIGS. 4A and 4B are torque diagrams showing relationships between an accelerator pedal opening and a vehicle traveling speed.
Figure 4A:
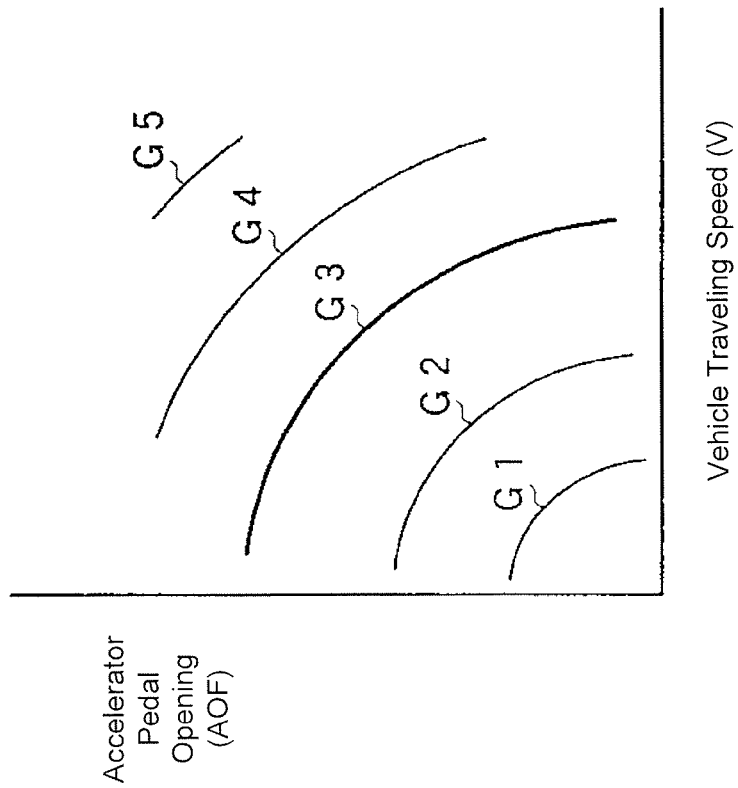

FIGS. 4A and 4B are graphs showing relationships between an accelerator pedal opening AOF and a vehicle traveling speed V. FIG. 4A shows the relationship in the case in which gasoline is used, and FIG. 4B shows the relationship in the case in which gaseous fuel is used.

Referring to FIG. 4, the auxiliary storage device of the control unit 100 also stores a torque control map Mt (refer to FIG. 13) for reducing torque fluctuations during the fuel switching. The torque control map Mt is for absorbing rapid fluctuations of the torque when the fuel being used is switched from gaseous fuel to gasoline based on the relationship between the accelerator pedal opening AOF and the vehicle traveling speed V. As illustrated, one graph of FIG. 4 defines torques to be equal to those torques illustrated in the other graph of FIG. 4. That is, G1 is equal to H1, G2 is equal to H2, and Gn is equal to Hn (n being an integer). By utilizing a torque control map Mt populated with data based on FIGS. 4A and 4B, when the fuel being used for the traveling vehicle is switched from gaseous fuel to gasoline at a certain target torque Ti, the accelerator pedal opening AOF and the vehicle traveling speed V to which the value of the target torque Ti becomes equal may be selected immediately after the switching. Thus, it is possible to make the torque fluctuations slower and to buffer shock that may occur upon executing the switching of the fuel being used from gaseous fuel to gasoline, as will be described later.

The control unit 100 also includes a nonvolatile memory as a part of the auxiliary storage device for storing a fuel flag used as an identifier to identify the fuel type currently selected.

Figure 5:
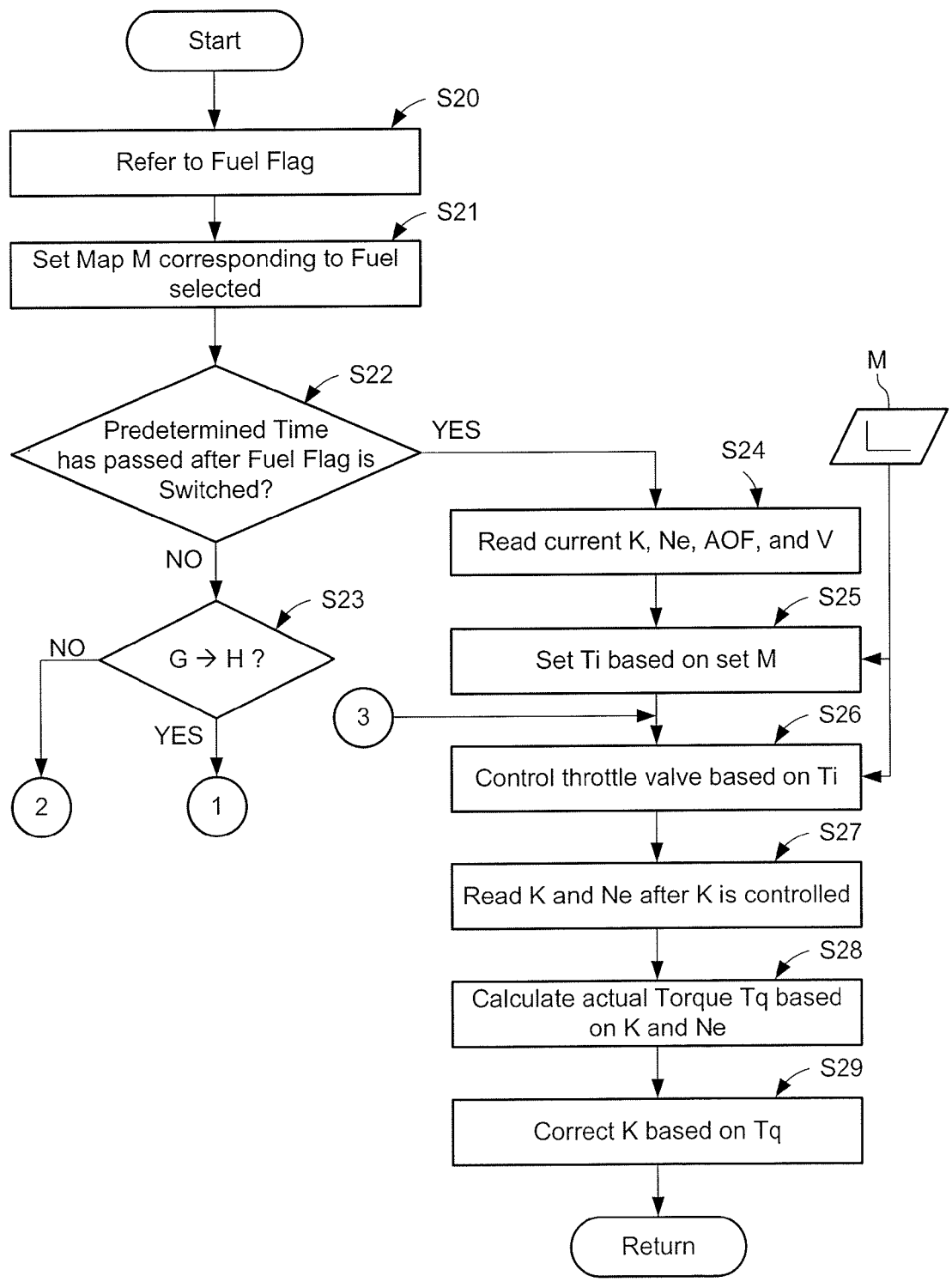
FIG. 5 is a flowchart showing a torque control of the engine according to the embodiment.

FIG. 5 is a flowchart showing a torque control routine of the engine according to this embodiment.

Referring to FIG. 5, while the engine 14 is running, the control unit 100 determines which type of fuel is selected based on the fuel flag (step S20), and a map M corresponding to the selected fuel (for example, gasoline) is set (step S21). In this step S21, if the fuel being used is gasoline, the gasoline map Mg is set as the map M. On the other hand, if the fuel being used is gaseous fuel, gaseous fuel map Mh is set as the map M.

Figure 6:
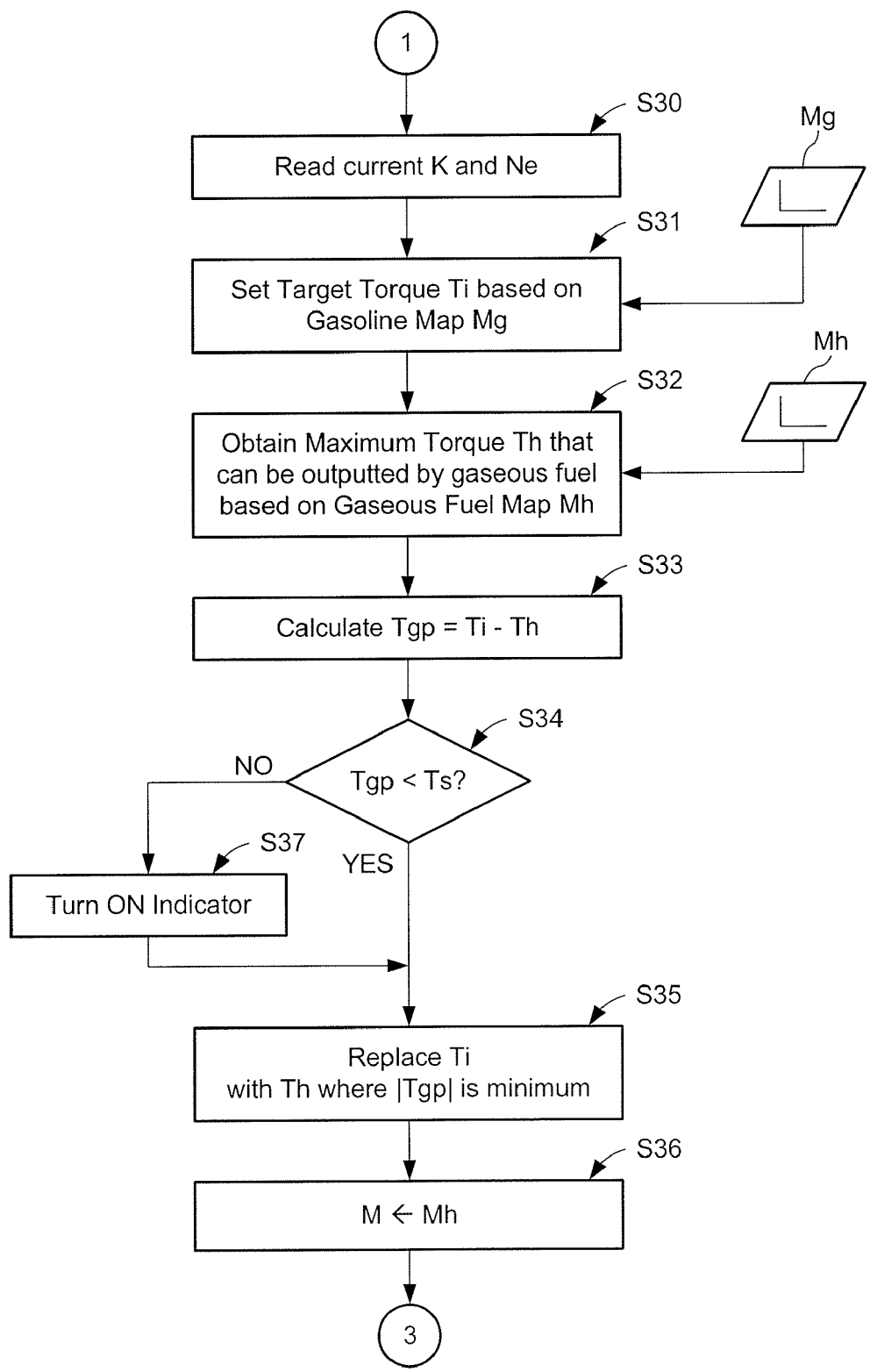
FIG. 6 is a flowchart showing the torque control of the engine where a fuel being used is switched from gasoline to gaseous fuel in the embodiment.
Figure 12:
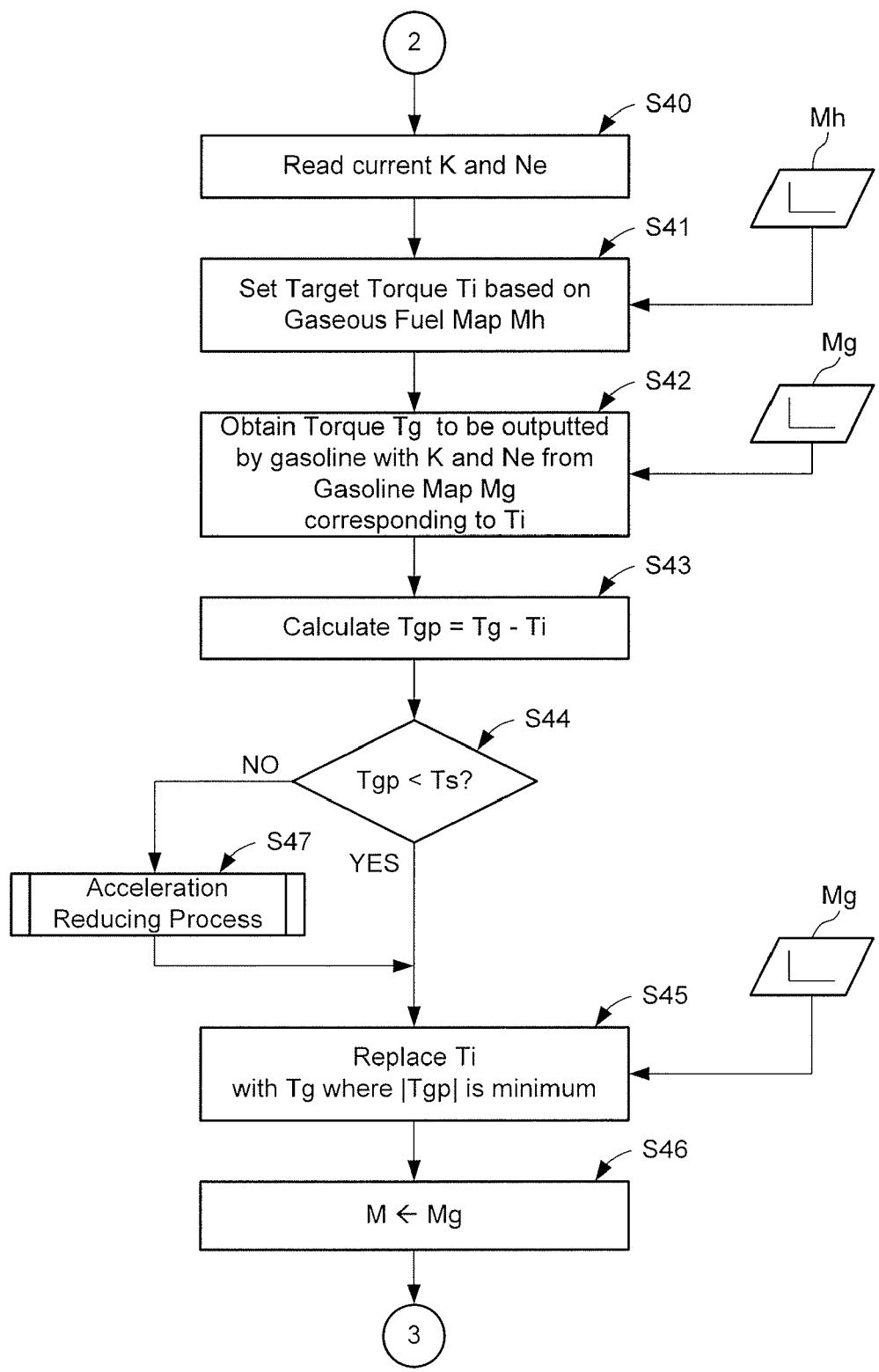
FIG. 12 is a flowchart showing the torque control where the fuel being used is switched from gaseous fuel to gasoline in the embodiment.

Next, the control unit 100 determines whether a predetermined time has passed after the fuel flag is switched (step S22). If the predetermined time has not passed in step S22 (NO in step S22), the control unit 100 further determines whether the switching of the fuel being used is from gasoline to gaseous fuel (step S23). As will be described later, if the fuel being used is switched from gasoline to gaseous fuel (YES in step S23), the flowchart shown in FIG. 6 is executed. On the other hand, if the fuel being used is switched from gaseous fuel to gasoline (NO in step S23), the flowchart shown in FIG. 12 is executed.

If the predetermined time has passed in step S22 (YES in step S22), the control unit 100 reads a current throttle opening K, engine speed Ne, accelerator pedal opening AOF, and vehicle traveling speed V from the accelerator pedal opening sensor SW4, engine speed sensor SW5, vehicle traveling speed sensor SW6, and throttle opening sensor SW7, respectively (step S24).

Next, based on the read values, the target torque Ti corresponding to the current traveling state is set based on the map M (step S25).

Next, based on the map M, the actuator 25 is driven based on the set target torque Ti to control the throttle valve 24 (step S26). It will be appreciated that, to adjust engine torque, a fuel amount supplied to the engine through fuel injectors 19 or 22 is typically adjusted. When a throttle opening K of the throttle valve 24 is adjusted at step S26, an amount of fresh air is inducted into the engine. An airflow meter (not shown) arranged in the intake air passage 23 upstream of the throttle valve 24, detects airflow in the intake air passage 23, and thus the amount of air inducted into the engine. Based on the detected airflow, an engine speed Ne and a target air-fuel ratio, the amount of fuel may be computed, for example, by controller 100. Usually, the target air-fuel ratio is a constant value, that is, a stoichiometric air-fuel ratio which depends on the kind of fuel to be combusted. Therefore, the throttle valve opening is adjusted, and the engine output torque will be adjusted accordingly.

Next, the throttle opening K and engine speed Ne after driving the actuator 25 are read again (step S27).

Next, an actual torque Tq is calculated based on the read throttle opening K and the engine speed Ne (step S28).

The calculated actual torque Tq and target torque Ti are compared, and the throttle opening K is corrected (step S29), and by returning to step S26, a feedback control for matching the target torque Ti and the actual torque Tq is realized.

If the fuel being used is switched from gasoline to gaseous fuel, referring to FIG. 6, the control unit 100 reads the current throttle opening K and the engine speed Ne (step S30). Next, the target torque Ti is set by the read values based on the gasoline map Mg (step S31).

Next, the control unit 100 reads a maximum torque Th obtained from gaseous fuel based on gaseous fuel map Mh (step S32). Next, the control unit 100 calculates a torque difference Tgp between the target torque Ti and the maximum torque Th (step S33).

Next, the control unit 100 determines whether the torque difference Tgp is less than a predetermined gap value Ts (step S34).

If the torque difference Tgp is less than the gap value Ts (YES in step S34), the control unit 100 sets a torque value Th as the target torque Ti where an absolute value of the torque difference Tgp is the minimum (step S35). Then, the map M is updated with gaseous fuel map Mh (step S36), and it returns to step S26.

On the other hand, if the torque difference Tgp is greater than the gap value Ts (NO in step S34), the control unit 100 causes an indicator turned ON (step S37) and then shifts to step S35. By forcing the indicator to be turned ON, the control unit 100 functions as a vehicle deceleration alerting control device. The indicator may be a visual indicator, for example, a brake lamp 42, an in-cabin indicator light 45 configured to be visible by a driver of the vehicle, and/or an audio indicator, such as an recorded voice message, alarm, etc. In some embodiments, both the in-cabin indicator light 45 and the brake lamp 42 are provided and configured to light at substantially the same time, giving the driver and indication of when the brake lamps 45 are illuminated. In other embodiments, the audio signal and brake lamps may be provided and configured to be emitted and lighted simultaneously. And, in other embodiments, only one indicator may be provided.

Figure 7:
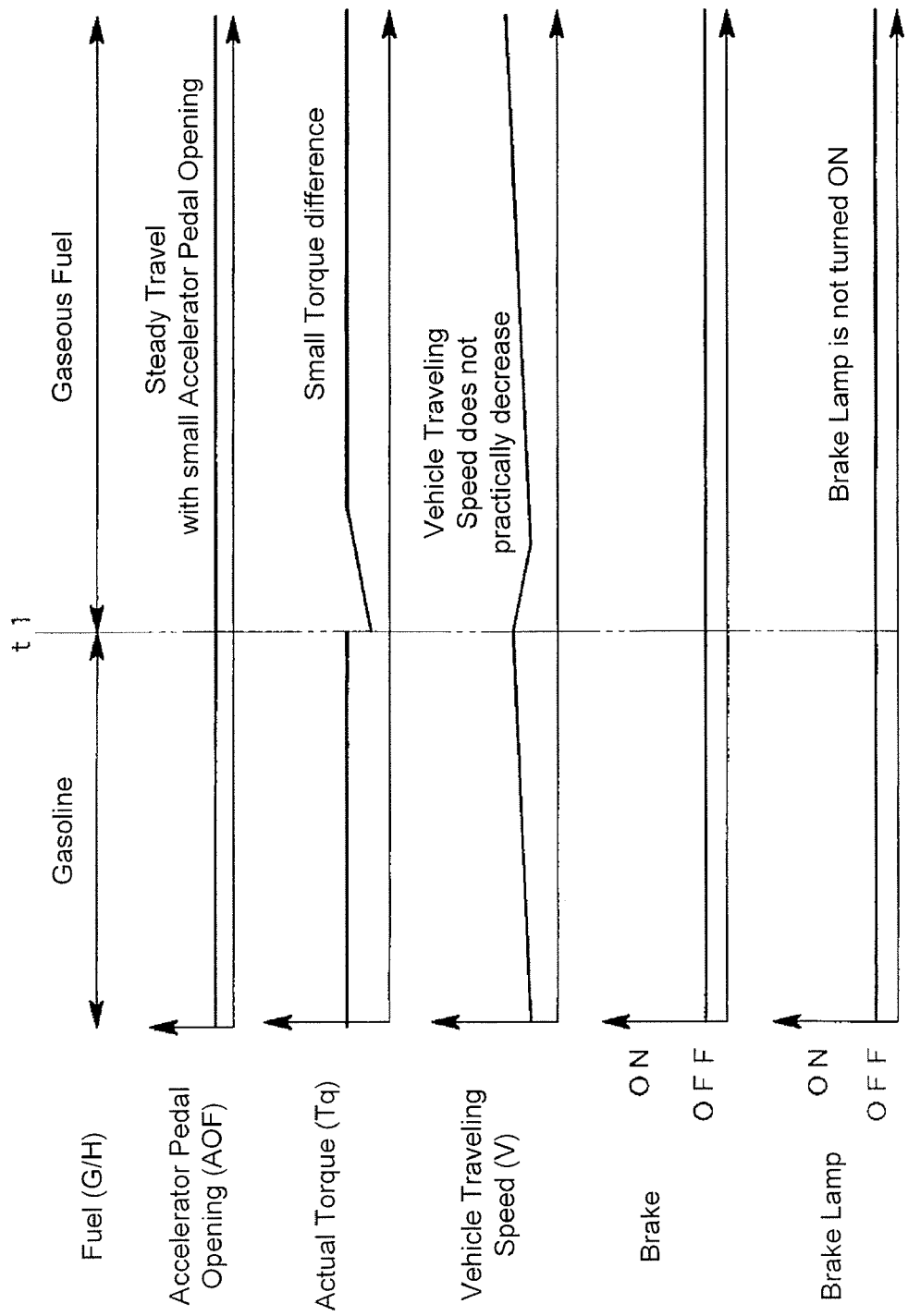
FIG. 7 is a time chart showing an example where steps S35 and S36 in FIG. 6 are executed.
Figure 8:
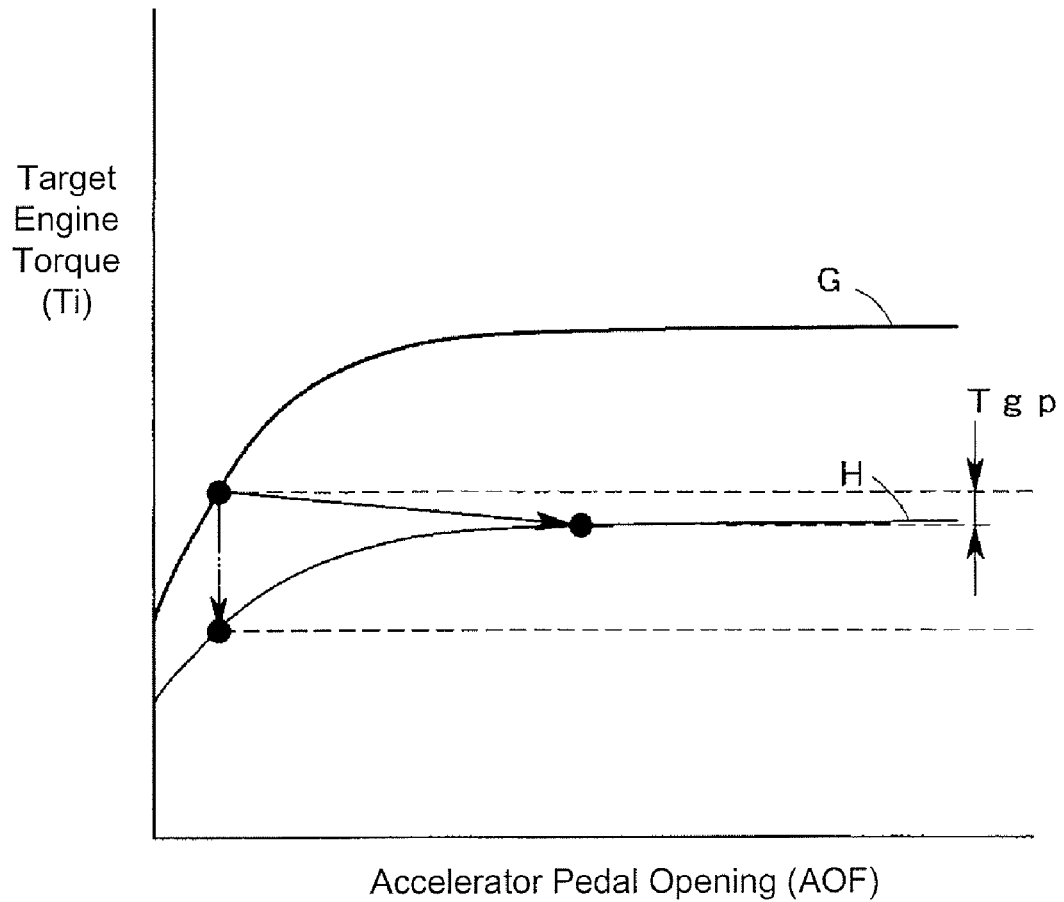
FIG. 8 is a graph illustrating an example relationship between accelerator pedal position and target torque, for explaining step S35 in FIG. 6.

FIG. 7 is a timing graph showing an example where steps S35 and S36 in FIG. 6 are executed, and FIG. 8 is a graph illustrating example accelerator pedal position and torque, for explaining step S35 in FIG. 6.

First, referring to FIG. 7, during steady travel with a small accelerator pedal opening AOF, if the operator switches the fuel being used from gasoline to gaseous fuel at a time t1, since the torque difference Tgp is relatively small, the actual torque Tq relatively promptly returns to the same level as operating with gasoline, and the vehicle traveling speed V hardly changes. Therefore, the indicator will not be turned ON in this case (described later). As a result, it is possible to control excessive alerts to an operator of a follow-on vehicle.

Referring to FIG. 8, even if Tgp is small, when the torque setting control is not executed, a control point becomes as a phantom line in FIG. 8 and, thus, a large torque shock may occur. On the other hand, in this embodiment, it is possible by adopting step S35 in FIG. 6 to reduce the torque difference Tgp during the switching as much as possible. In the meantime, during the steady travel, although the value of Tgp may be a negative value in rare cases, since the absolute value is set to become a minimum in step S35, the control point shifts so that Tgp may be zero in this case.

Figure 9:
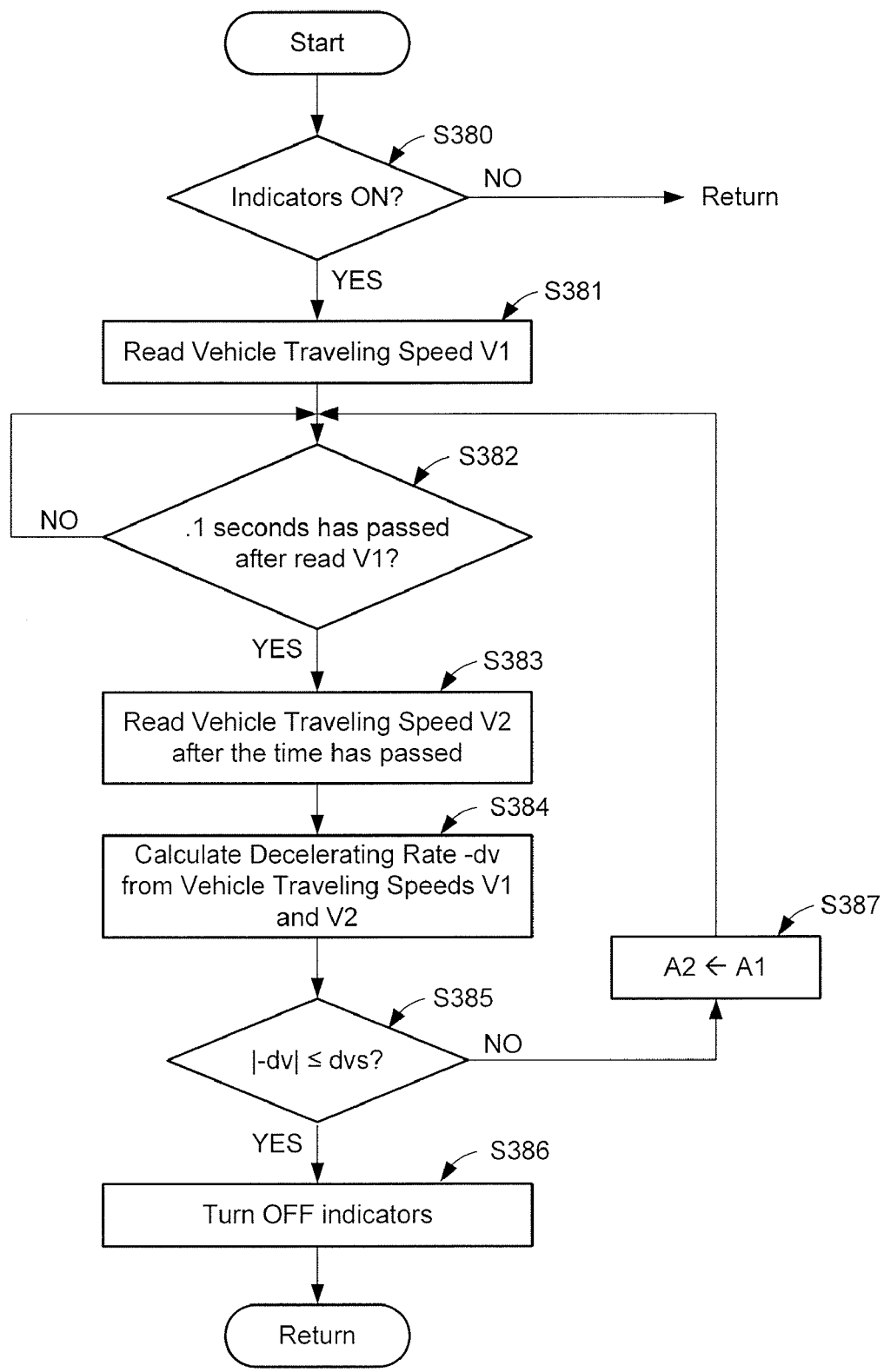
FIG. 9 is a flowchart showing a routine to cancel an indicator turned on in FIG. 6.

Next, referring to FIG. 9, in an Alert Canceling Process Subroutine, first, the control unit 100 determines whether indicator lights 45 are turned ON (step S380). If the indicator is tuned ON (YES in step S380), the control unit 100 reads a vehicle traveling speed V1 (step S381). Next, the control unit 100 holds for a predetermined period of time (0.1 second in the illustrated example) after reading the vehicle traveling speed V1 (step S382), and when the predetermined period of time has passed, the control unit 100 reads a vehicle traveling speed V2 after the predetermined time has passed (step S383). Next, the control unit 100 calculates a deceleration rate-dv based on the vehicle traveling speed V1 and V2 (step S384). Next, the control unit 100 compares an absolute value of the calculated deceleration rate-dv with a predetermined changing rate dvs, and determines whether the absolute value of the deceleration rate-dv is reducing (step S385). If the absolute value of the deceleration rate decreases below to the changing rate dvs (YES in step S385), the control unit 100 turns OFF the indicator (step S386). As a result, it is possible to reduce discomfort to the operator of a following vehicle caused by turning ON the brake lights 42. On the other hand, if the absolute value of the deceleration rate is still high (NO in step S385), the control unit 100 updates the vehicle traveling speed V2 read in step S383 to the initial vehicle traveling speed V1 (step S387), and returns to step S382.

As described above in relation to FIG. 9, canceling or stopping the indicator after the indicator has already begun emitting a signal, or prohibiting the indicator from emitting a visual or audio signal, may be based on a vehicle operating condition, such as vehicle speed and change in vehicle speed. Alternatively or in addition, the vehicle operation condition upon which the signal indication from the indicator is cancelled, stopped or prohibited may be engine torque. For example, a change of the actual torque Tq determined at the step S28 of FIG. 5 may be used for this determination. Accordingly, when the change is not negative, the signal indication may be stopped. Also, a change of the vehicle acceleration can be considered by differentiating the vehicle speed detected by the vehicle speed sensor SW6.

In one embodiment, for example, indication of the signal may be prohibited when a desired output torque, also referred to as target torque, of said internal combustion engine is below a predetermined torque. Further, indication of the signal may be prohibited when the desired output torque of said internal combustion engine after said switching the fuel is within a predetermined amount from the desired output torque before said switching.

Next, referring to FIGS. 10 and 11, an example in which the brake lights 42 or indicator light 45 is turned on will be explained.

Figure 10:
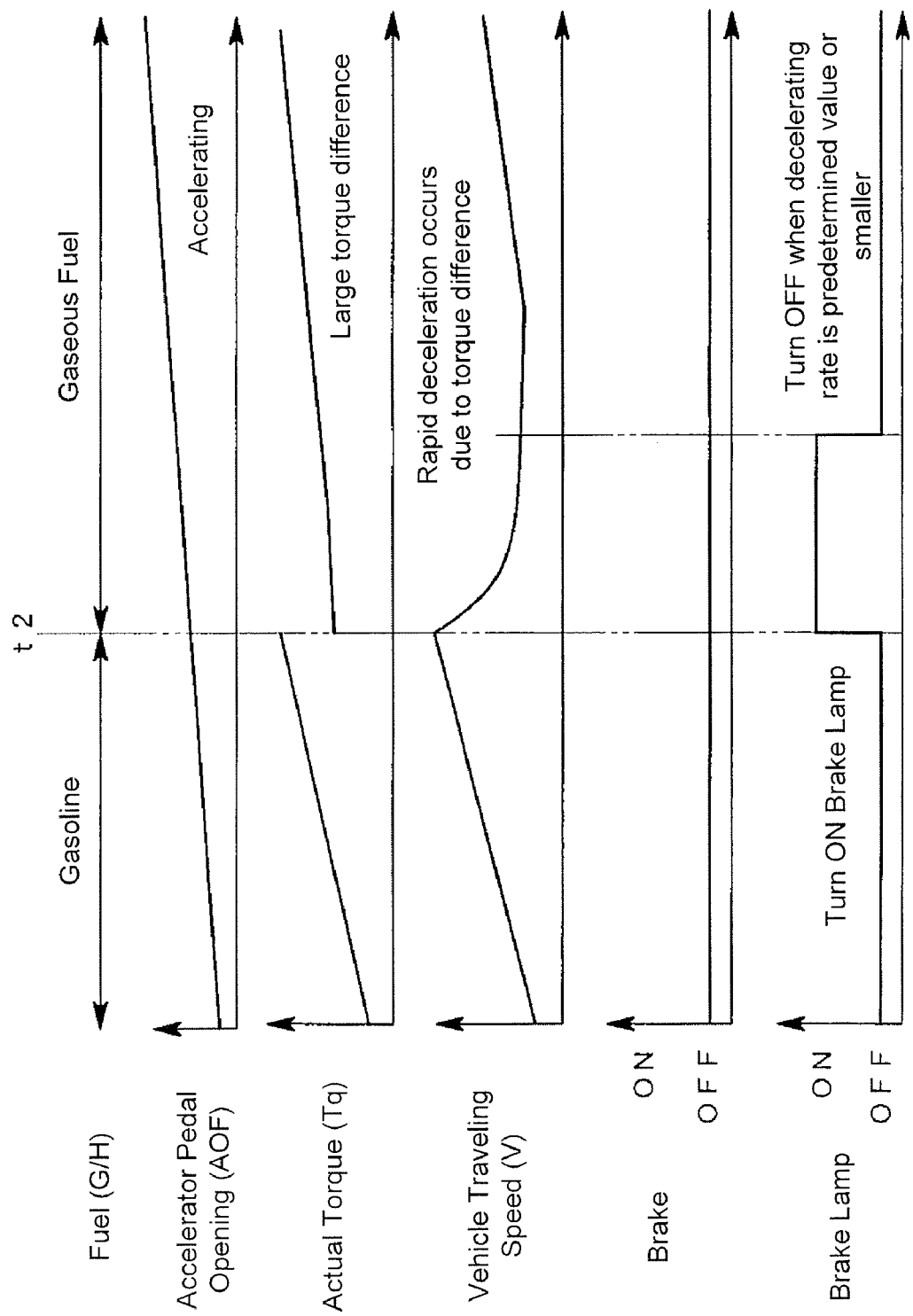
FIG. 10 is a time chart showing an example where steps S37 and S38 in FIG. 6 are executed.
Figure 11:
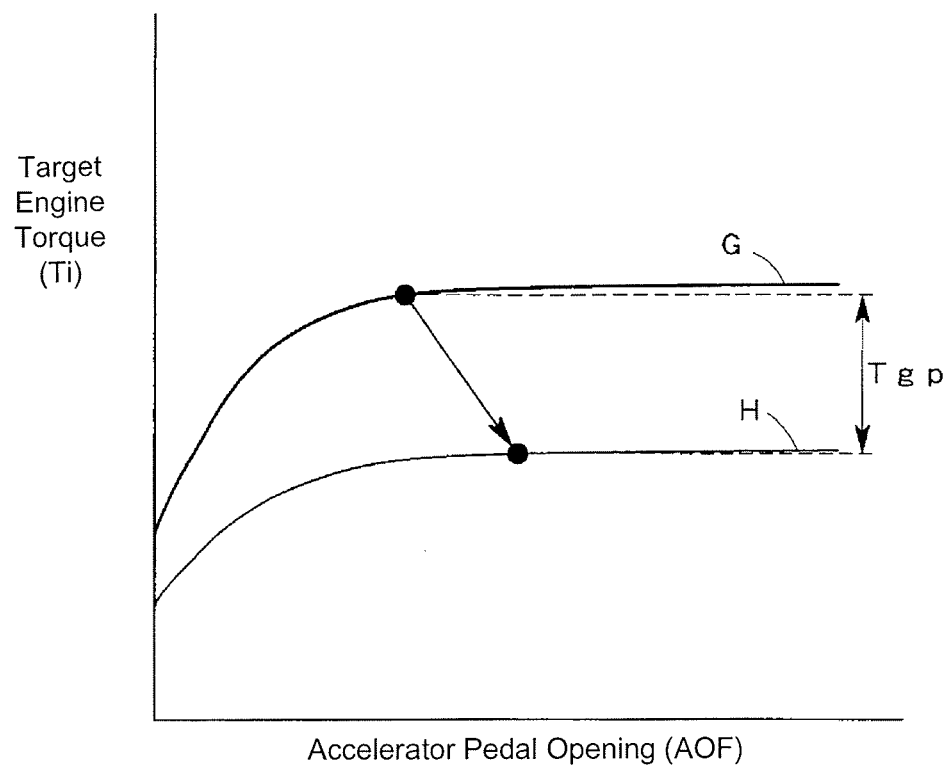
FIG. 11 is a graph illustrating an example of changes of accelerator pedal position and target torque, during execution of steps S37 and S38 in FIG. 6.

Referring to FIGS. 10 and 11, for example, if the traveling state of the vehicle 10 is accelerating, when the fuel being used is switched from gasoline to gaseous fuel at a time t2, a large torque difference Tgp occurs even if the throttle opening K is fully open (WTO). In this case, the brake lamp 42 is turned ON when the fuel being used is switched (step S37 in FIG. 6).

Then, when the vehicle traveling speed V gradually decreases and the absolute value of the deceleration rate-dv becomes small, the brake lamp 42 is turned OFF by control of the Alert Canceling Process Subroutine illustrated in FIG. 9.

Next, referring to FIGS. 12, 13, and 14, control routines in which the fuel being used is switched from gaseous fuel to gasoline will be explained.

FIG. 12 is a flowchart showing a torque control routine where the fuel being used is switched from gaseous fuel to gasoline in this embodiment. FIG. 13 is a flowchart showing the Acceleration Reducing Process Subroutine in FIG. 12. FIG. 14 is a graph illustrating an example of accelerator pedal position and target torque, for explaining a control where the fuel being used is switched from gaseous fuel to gasoline.

First, referring to FIG. 12, if the operator switches the fuel being used from gaseous fuel to gasoline, the control unit 100 reads the current throttle opening K and engine speed Ne (step S40). Next, the target torque Ti is set by the read values based on gaseous fuel map Mh (step S41).

Next, based on gasoline map Mg, the control unit 100 obtains a torque Tg outputted by the throttle opening K and the engine speed Ne corresponding to the target torque Ti with gasoline (step S42). The control unit 100 then calculates the torque difference Tgp between the target torque Ti and the torque Tg (step S43).

Next, the control unit 100 determines whether the torque difference Tgp is less than the predetermined gap value Ts (step S44).

If the torque difference Tgp is less than the gap value Ts (YES in step S44), the control unit 100 sets the torque value Tg as the target torque Ti where the absolute value of the torque difference Tgp is the minimum (step S45). Then, the map M is updated to the gasoline map Mg (step S46), and it returns to step S26.

On the other hand, if the torque difference Tgp is greater than the gap value Ts (NO in step S44), the control unit 100 executes the Acceleration Reducing Process Subroutine S47, and then shifts to step S45. By executing the Acceleration Reducing Process Subroutine S47, the control unit 100 functionally constitutes an acceleration reducing control device.

Figure 13:
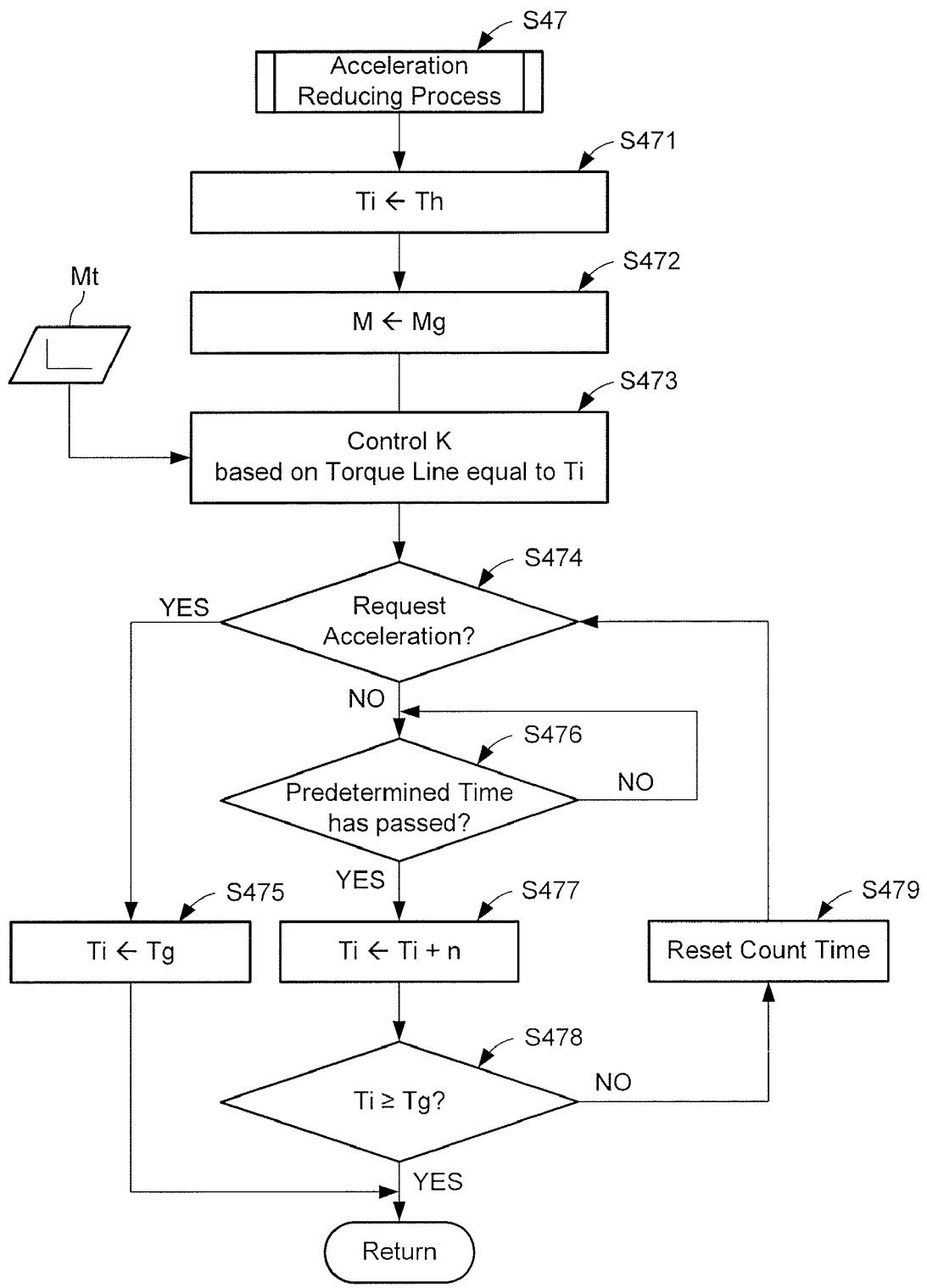
FIG. 13 is a flowchart showing an Acceleration Reducing Process Subroutine shown at step S47 in FIG. 12.
Figure 14:
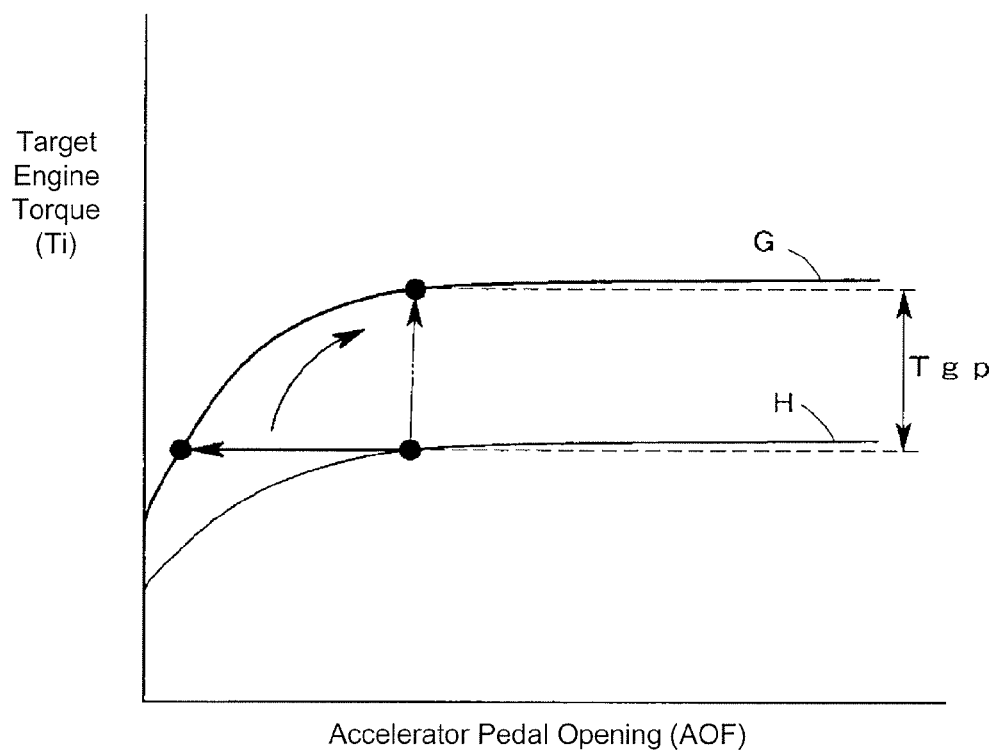
FIG. 14 is a graph illustrating an example of accelerator pedal position and target torque, for explaining a control where the fuel being used is switched from gaseous fuel to gasoline.

Next, referring to the Acceleration Reducing Process Subroutine S47 shown in FIGS. 13 and 14, first, the control unit 100 sets the target torque Th by the gaseous fuel immediately before the switch as the target torque Ti after the switch (step S471). Further, the map M is set as the gasoline map Mg (step S472), and based on the torque control map Mt, K is set by the torque line that is equal to the target torque Ti set in step S471 (step S473).

In this control routine, referring to FIGS. 4A and 4B, if the target torque Th by the gaseous fuel immediately before the switch is H3 in FIG. 4B, the target torque Ti after the switch is set as G3 irrespective of the values of the current throttle opening K and vehicle traveling speed V, and the throttle opening K is controlled based on G3.

Returning to FIG. 13, next, in the embodiment, the control routine is configured to determine whether an acceleration request exists based on whether the accelerator pedal opening AOF increases after the switch of the fuel being used (step S474). In this determination, if the acceleration request exists, it is considered to be recognized by the operator that the vehicle 10 will accelerate suddenly in accordance with switching the fuel. Therefore, after setting the target torque Ti as the torque Tg by gasoline (step S475), it immediately returns to the original routine, and inhibits the Acceleration Reducing Process.

On the other hand, in step S474, if the acceleration request does not exist, the control unit 100 holds for a predetermined time (step S476). This predetermined time may be 60 seconds, for example. The predetermined time does not have to be a constant time, and may be a variable time.

If the predetermined time has passed, the control unit 100 updates the target torque Ti by a value adding a predetermined value n to the target torque Ti as a new target torque Ti (step S477).

Next, the control unit 100 determines whether the target torque Ti has reached the torque Tg by the gasoline to be set originally for the traveling state during the fuel switch (step S478). In step S473, this determination is realized by reading and storing the torque line G equivalent to the torque Tg by the gasoline to be set originally from the accelerator pedal opening AOF when referring to the torque control map Mt.

If the target torque Ti has reached the torque Tg (YES in step S478), control of the control unit 100 returns to the main routine. On the other hand, if the target torque Ti has not reached the torque Tg (NO in step S478), it resets the count time (step S479), and repeats the control from step S474.

Referring to FIG. 14, when the Acceleration Reducing Process Subroutine S47 is executed, the torque difference Tgp resulting from the switch of fuel being used is reduced as much as possible, and after that, it is possible to resume the original torque as time passes. Therefore, it is possible to accelerate smoothly without causing discomfort to the operator.

As described above, in this embodiment, since the brake lamp 42 as the vehicle deceleration alerting device indicates the deceleration of the vehicle 10 when the fuel being used is switched from gasoline to gaseous fuel, in a traveling state in which a deceleration of the vehicle 10 resulting from the torque decrease tends to occur, it is possible to report the deceleration of the vehicle 10 and urge cautions to the operator on the follow-on vehicle, in order to improve the road traffic safety.

Further, in this embodiment, the vehicle deceleration alerting device turns ON the brake lamp of the vehicle 10. Thus, in this embodiment, with the existing equipments, since it can turn ON the brake lamp 42, it is possible to certainly inform the operator of the follow-on vehicle that the vehicle 10 may decelerate with a less expensive configuration that is easy to realize.

In this embodiment, when the fuel being used is switched from gasoline to gaseous fuel, the control unit 100 functionally constitutes the alert controlling device that executes the alerting to the follow-on vehicle when the torque difference Tgp between the engine torque Tg by gasoline in the current traveling state and the engine torque Th when switched to gaseous fuel is greater than the gap value Ts, while controlling the brake lamp 42 so that it inhibits the alerting when less than the gap value Ts. For this reason, in this embodiment, since the alert to the operator of a following vehicle is executed only when a relatively large deceleration occurs, it is possible to avoid excessive alerting, and prevent discomfort to the operator on the follow-on vehicle.

Further, in this embodiment, the control unit 100 functionally constitutes the deceleration rate detecting device for detecting the deceleration rate of the vehicle 10, and an alert ending device for terminating the alert by the brake lamp 42 when the calculation result by the deceleration rate detecting device is less than the predetermined changing rate dvs of the vehicle 10 after the switching the fuel being used from gasoline to gaseous fuel. For this reason, in this embodiment, by continuing the alert until the deceleration rate of the vehicle becomes small, it is possible to secure safe travel of the following vehicle, while avoiding excessive alerting when it becomes less than the predetermined changing rate dvs, and preventing the discomfort to the operator of the follow-on vehicle.

Further, in this embodiment, the vehicle traveling speed sensor SW6 as the vehicle traveling speed detecting device for detecting a value related to the traveling speed of the vehicle 10 is provided, and the control unit 100 as the deceleration rate detecting device detects the deceleration rate-dv based on the detection by the vehicle traveling speed sensor SW6. For this reason, in this embodiment, since the deceleration rate-dv is detected based on the vehicle traveling speed V, it is possible to achieve the deceleration determination in a deceleration state apparently viewed by the operator of the follow-on vehicle, and realize a control closer to human sense.

Further, in this embodiment, the control unit 100 as the alert controlling device may determine the torque difference Tgp based on the maximum engine torque by gaseous fuel. The control unit 100 functionally constitutes a target torque setting device for setting the target torque so that the torque difference Tgp is the minimum when the torque difference Tgp is less than the gap value Ts. For this reason, in this embodiment, it is possible to reduce the torque decrease as much as possible when the fuel being used is switched from gasoline to gaseous fuel.

As described above, in the embodiment, during a traveling state in which deceleration of the vehicle 10 resulting from the torque decrease tends to occur, it produces an effect that it alerts the deceleration of the vehicle 10 to the operator on the follow-on vehicle of the vehicle 10, and it is possible to improve the road traffic safety.

The above-mentioned embodiment is only a one example and is not to be considered as exclusive or limiting as various modifications are possible. For example, the switching method of the fuel being used is not limited to a manual type as described in the embodiment above, and may be an automatic type in which a control unit automatically switches according to the traveling state.

Further, as an example of the vehicle deceleration alert may be an alert of "vehicle will decelerate" or other suitable phrase by an audible signal which a sound generating device such as a speaker system emits to the inside or outside of the automotive vehicle.

Further, the vehicle deceleration alert may be a viewable display of "vehicle will decelerate" on a rear window of the vehicle. This method can be easily realized by an image projection device like a so-called head-up display.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling a vehicle system having an internal combustion engine to propel a vehicle, said internal combustion engine being capable of combusting at least two different compositions of fuel, the method comprising:
    changing the composition of fuel supplied to said internal combustion engine;
    indicating a signal in accordance with the fuel composition change; and
    prohibiting said indicating the signal when the desired output torque of said internal combustion engine is below a predetermined torque even if the fuel composition change occurs.

2. The method as described in claim 1, wherein said indicating the signal is prohibited when the desired output torque of said internal combustion engine after said switching the fuel is within a predetermined amount from the desired output torque before said switching.

3. The method as described in claim 1, wherein said indicating the signal after started is stopped in accordance with an operating condition of said vehicle.

4. The method as described in claim 1, wherein said signal is recognizable from outside of said vehicle.

5. The method as described in claim 4, wherein said signal is visible from behind said vehicle.

6. The method as described in claim 1, wherein said signal is indicated to a driver of said vehicle.

7. A method of controlling a vehicle system having an internal combustion engine to propel a vehicle, said internal combustion engine being capable of combusting at least two different compositions of fuel, the method comprising:
    changing the composition of fuel supplied to said internal combustion engine;
    beginning to indicate a signal in accordance with the fuel composition change; and
    stopping the signal indication if an absolute value of a deceleration rate of said vehicle decreases below a predetermined value.

8. The method as described in claim 7, wherein said signal is recognizable from outside of said vehicle.

9. The method as described in claim 8, wherein said signal is visible from behind said vehicle.

10. The method as described in claim 7, wherein said signal is indicated to a driver of said vehicle.

11. The method as described in claim 1, wherein said indicating the signal is prohibited when a torque difference between a target torque and a maximum torque generated by a composition to be used after said changing the composition of fuel is below a predetermined value.

* * * * *